US011079273B2

(12) United States Patent
Kasim et al.

(10) Patent No.: US 11,079,273 B2
(45) Date of Patent: Aug. 3, 2021

(54) CODED APERTURE SPECTRAL IMAGING DEVICE

(71) Applicant: Oxford University Innovation Limited, Oxford (GB)

(72) Inventors: Muhammad Firmansyah Kasim, Oxford (GB); Peter Norreys, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 16/634,588

(22) PCT Filed: Jul. 23, 2018

(86) PCT No.: PCT/GB2018/052064
§ 371 (c)(1),
(2) Date: Jan. 28, 2020

(87) PCT Pub. No.: WO2019/025759
PCT Pub. Date: Feb. 7, 2019

(65) Prior Publication Data
US 2020/0158568 A1 May 21, 2020

(30) Foreign Application Priority Data

Aug. 1, 2017 (GB) ...................... 1712357

(51) Int. Cl.
*G01J 3/02* (2006.01)
*G01J 3/28* (2006.01)
(52) U.S. Cl.
CPC .......... *G01J 3/0208* (2013.01); *G01J 3/0229* (2013.01); *G01J 3/2803* (2013.01); *G01J 3/2823* (2013.01)

(58) Field of Classification Search
CPC .................................................. G01J 3/0208
(Continued)

(56) References Cited

U.S. PATENT DOCUMENTS 5,627,639 A 5/1997 Mende et al.
6,996,292 B1 2/2006 Gentry et al.
(Continued)

FOREIGN PATENT DOCUMENTS

CN 103575396 A 2/2014
CN 103743482 A 4/2014

OTHER PUBLICATIONS

International Search Report and Written Opinion for PCT/GB2018/052064, dated Oct. 2, 2018, pp. 1-10.
(Continued)

*Primary Examiner* — Tarifur R Chowdhury
*Assistant Examiner* — Omar H Nixon
(74) *Attorney, Agent, or Firm* — Thomas|Horstemeyer, LLP (57) ABSTRACT

An imaging spectrometer (100) is provided, comprising: an entrance opening (101) configured to admit light to the spectrometer (100), a coded aperture (120), at least one dispersive element (111, 112), a two-dimensional array detector (130), and a plurality of converging optical elements (121, 122, 123, 124). The plurality of converging optical elements (121, 122, 123, 124) are configured to focus light from the entrance opening (101) at the coded aperture (120), and to focus light from the coded aperture (120) at the detector (130). The coded aperture (120) is arranged to modulate light from the entrance opening (101) in at least one of the spatial and spectral domain. The at least one dispersive element (111, 112) comprises a dispersive element (111, 112) between the coded aperture (120) and the detector (130). The at least one converging optical element
(Continued)

(121, 122, 123, 124) comprises at least one concave reflector.

19 Claims, 8 Drawing Sheets

(58) Field of Classification Search
USPC .......................................................... 356/326
See application file for complete search history.

(56) References Cited

U.S. PATENT DOCUMENTS

| | | | |
|---|---|---|---|
| 2005/0243312 A1* | 11/2005 | Geshwind | G01J 3/10 356/310 |
| 2007/0263211 A1* | 11/2007 | Manos | G01J 3/28 356/326 |
| 2007/0296965 A1 | 12/2007 | Brady et al. | |
| 2010/0253941 A1 | 10/2010 | Brady et al. | |
| 2014/0374573 A1* | 12/2014 | Arce | G01J 3/14 250/208.1 |

OTHER PUBLICATIONS

UK Search Report for GB 712357.1, dated Jan. 26, 2018, pp. 1-6.
Optics Express, vol. 15, 21 (2007), Gehm, M. R., et al., "Single-shot compressive spectral imaging with a dual-disperser architecture", 14013-14027.

* cited by examiner

CODED APERTURE SPECTRAL IMAGING DEVICE

CROSS-REFERENCE TO RELATED APPLICATIONS

This application is the National Stage of International Application No. PCT/GB2018/052064, filed Jul. 23, 2018, which claims priority to GB 1712357.1, filed Aug. 1, 2017, which are entirely incorporated herein by reference.

TECHNICAL FIELD

The present invention relates to coded aperture spectral imaging, for instance of a plasma wakefield.

BACKGROUND

Compressed sensing is a signal processing technique for efficiently acquiring and reconstructing signals from a relatively small number of measurements. A relatively small number of samples can be used to reconstruct a signal from a sparse system, by using the sparsity as a constraint in solving the underdetermined system that relates the samples to the signal. In a sparse system many coefficients of this system will be zero or close to zero.

The development of compressed sensing in the last decade or so has opened up new kinds of diagnosis and measurements in science and engineering. One example is the single pixel camera (Duarte, Marco F., et al. "Single-pixel imaging via compressive sampling." IEEE signal processing magazine 25.2 (2008): 83-91), which is useful for imaging in wavelengths where a detector array is expensive. Another compressed imaging example is the 100 billion frame per second camera (Gao, Liang, et al. "Single-shot compressed ultrafast photography at one hundred billion frames per second." Nature 516.7529 (2014): 74-77).

Spectrometers are widely used in science, for example to study ultra-short laser pulses and laser-matter interaction fields (e.g. plasma wakefields). One type of spectrometer that is used in experiments with lasers is the Czerny-Turner spectrometer, with narrow slits. With a narrow slit and a 2D charge coupled device (CCD) array, one can obtain the spectral function of a slice of light coming through the slit. This can be a problem when there is a need to obtain the spectral profile of a different slice of light, which would require multiple measurements at different slit locations. Furthermore, there is no guarantee that measurement conditions are repeatable from shot to shot in a laser experiment (for example due to shot-to-shot variation). These problems can make multiple measurements problematic.

Coded aperture snapshot spectral imaging has been proposed, using a single disperser (SD-CASSI, Wagadarikar, Ashwin, et al. "Single disperser design for coded aperture snapshot spectral imaging." Applied optics 47.10 (2008): B44-B51) and a double dispersers (DD-CASSI, Gehm, M. E., et al. "Single-shot compressive spectral imaging with a dual-disperser architecture." Optics express 15.21 (2007): 14013-14027). These both disclose the use of disperser elements and a coded aperture to retrieve a 2-dimensional spatial and a 1-dimensional spectral profile of a scene.

Figure 1:
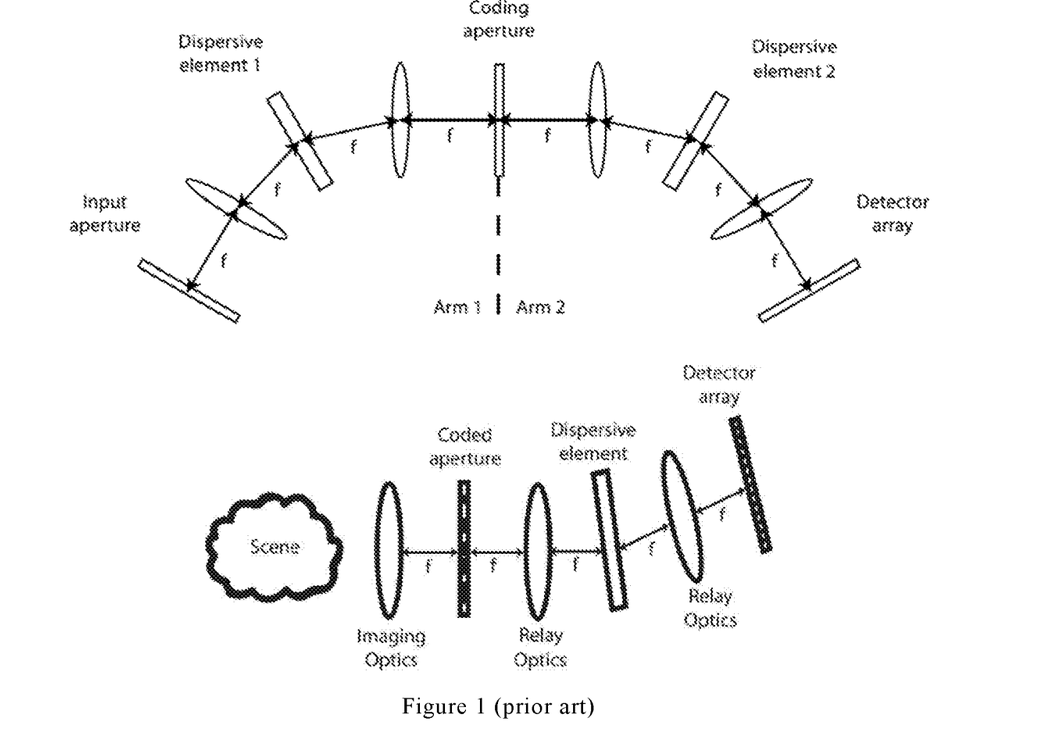
FIG. 1 shows the optical layout of the prior art DD-CASSI and SD-CASSI instruments.

In DD-CASSI (illustrated in FIG. 1), a coded aperture is placed between a first and second disperser element. The first disperser shears the light's spectral profile, then the coded aperture blocks some portion of the light in the spatial domain and the spectral domain, and finally the second disperser reverses the dispersion from the first disperser. A 2D detector array is employed to detect the light after the second disperser. From a 2D image captured by the detector, the 2D spatial and 1D spectral profile of the light can be retrieved. In essence, DD-CASSI sacrifices spatial information to gain spectral information about the data cube. Spectral information from each spatial location in the scene is multiplexed over a localised region of the detector.

SD-CASSI (also illustrated in FIG. 1) has a similar configuration to DD-CASSI, except that it does not have the first disperser element. Some portion of light coming from a scene will be blocked by a coded aperture, then the light from the coded aperture is sheared by the disperser (transforming the spatial modulation into both spectral and spatial modulation), and finally recorded on the detector.

Since DD-CASSI multiplexes only spectral information in the data cube, it cannot reconstruct the spectrum of a point source object. On the other hand, SD-CASSI can reconstruct the spectrum of a point source, provided that the source spatially maps to an open element on the coded input aperture. This implies that, for reconstructions that demand high spatial resolution with less stringent demands on spectral resolution, the DD-CASSI arrangement may be preferred. On the other hand, when spectral resolution is more critical than spatial resolution in the data cube, the SD-CASSI arrangement may be preferable.

In SD-CASSI, a measurement is done in the spectral and spatial domain, while randomisation (from the coded aperture) is applied to the spatial domain only. The measurement matrix in SD-CASSI therefore has reasonably high coherence for measurements that demand much more spectral information than spatial information.

Therefore, for some spectrometer applications, such as interferometry, which require high accuracy and high resolution in spectral profile as well as a post-processing analysis, SD-CASSI might give undesirable results.

SUMMARY

An imaging spectrometer that overcomes, or at least ameliorates, at least some of the above mentioned problems is desirable.

According to a first aspect of the invention, there is provided an imaging spectrometer, comprising: an entrance opening configured to admit light to the spectrometer, a coded aperture, at least one dispersive element, a two-dimensional array detector, and a plurality of converging optical elements; wherein:

the plurality of converging optical elements are configured to focus light from the entrance opening at the coded aperture, and to focus light from the coded aperture at the detector, the coded aperture is arranged to modulate light from the entrance opening in at least one of the spatial and spectral domain, the at least one dispersive element comprises a dispersive element between the coded aperture and the detector, wherein the at least one converging optical element comprises at least one concave reflector.

A concave reflector may produce very little dispersion (e.g. chromatic aberration), resulting in more control over dispersion of the light within the spectrometer.

The imaging spectrometer may further comprise a processor, configured to reconstruct a signal from a signal provided by the detector using a compressed sensing algorithm. The signal may comprise a hyperspectral image, comprising spectral and spatial information about a scene.

The at least one concave reflector may be configured do at least one of: i) direct and collimate light at the dispersive element, ii) direct and focus light at the coded aperture and iii) direct and focus light at the detector.

The at least one dispersive element may comprise a first dispersive element between the entrance opening and the coded aperture, and the dispersive element between the coded aperture and the detector may be a second dispersive element.

The first dispersive element may be arranged to shear light from the entrance opening in a first direction, and the second dispersive element may be arranged to shear light from the coded aperture in a second direction, opposite to the first direction.

The at least one concave reflector may be configured to do at least one of: direct light from the entrance opening to the first dispersive element, direct light from the first dispersive element to the coded aperture, direct light from the coded aperture to the second dispersive element, and direct light from the second dispersive element to the detector.

The spectrometer may be configured such that light incident on the detector is sheared in the second direction so that each location on the detector corresponds with a plurality of spatial locations of the scene.

This gives more randomisation in the measurement compared to conventional systems such as SD-CASSI, providing reduced coherence and improved ability to retrieve a signal (e.g. spectral and spatial information) from the measurement data from the detector. The use of an additional dispersion stage may confer this advantage independent of whether reflective or refractive optics are used in the spectrometer (as described in the second aspect of the invention). The additional dispersion stage can be achieved by an optical path that traverses a dispersion element twice (in a folded optical configuration), or by using three dispersive elements (in an unfolded optical configuration).

The at least one concave reflector may comprise a first concave reflector, arranged to collimate light from the entrance opening at the first dispersive element.

The at least one concave reflector may comprise a second concave reflector, arranged to focus light from the first dispersive element at the coded aperture array.

The at least one concave reflector may comprise a third concave reflector, arranged to collimate light at the second dispersive element.

The at least one concave reflector may comprise a fourth concave reflector, arranged to focus light at the detector.

The at least one concave reflector may comprise at least one concave toroidal reflector and/or at least one off-axis parabolic reflector and/or at least one spherical reflector and/or at least one on-axis parabolic reflector. Preferably, a toroidal or off-axis parabolic reflector may be used.

The at least one concave reflector may have a focal length of Between 10 cm and 20 cm.

The at least one reflector may comprise a first, second, third and fourth concave reflector, respectively configured to i) collimate light from the entrance slit at the first dispersive element; ii) focus light from the first dispersive element at the coded aperture array; iii) collimate light at the second dispersive element; and iv) focus light at the detector.

Each of the first, second, third and fourth concave reflector may have the same focal length.

The entrance opening may be an entrance slit.

The entrance slit may be at least 50 microns wide, or at least 100 microns wide. The entrance slit may be between 100 microns and 300 microns in width.

The coded aperture may comprise an array of at least 50×50 pixels.

The coded aperture array may be operable in a reflective mode, so that a coded pattern of light is reflected towards the detector by the coded aperture array, and the inverse of the coded pattern of light is dumped and/or absorbed by the coded aperture array.

The coded aperture array may be operable to reflect the coded pattern of light back towards the detector via the first dispersive element, wherein the first dispersive element is configured to, in addition to applying shear to the light from the entrance slit, subsequently remove that shear from the coded pattern of light after reflection at the coded aperture array.

The imaging spectrometer may further comprise a beam splitter configured to direct some of the light from the entrance opening towards the first dispersive element, and to direct some of the returning coded pattern of light from the first dispersive element towards the second dispersive element.

The at least one reflector may comprise a third curved reflector, and the third reflector arranged to collimate light from the beam splitter at the second dispersive element.

The coded aperture array may be operable in a transmissive mode, such that a coded pattern of light is transmitted towards the detector by the coded aperture array, and the inverse of the coded pattern of light is dumped and/or absorbed by the coded aperture array.

The imaging spectrometer may further comprise a third dispersive element arranged to shear the coded pattern of light from the coded aperture array in the second direction to remove the shear from the coded pattern of light.

The imaging spectrometer may further comprise a fifth reflector, configured to focus light from the third dispersive element at a focal plane.

The imaging spectrometer may further comprise a sixth reflector, configured to collimate light from the focal plane at the second dispersive element.

According to a second aspect, there is provided an imaging spectrometer, comprising: an entrance opening configured to admit light to the spectrometer, a coded aperture, a first and second dispersive element, a two-dimensional array detector, and a plurality of converging optical elements; wherein:
  the plurality of converging optical elements are configured to focus light from the entrance opening at the coded aperture, and to focus light from the coded aperture at the detector,
  the coded aperture is arranged to modulate light from the entrance opening in at least one of the spatial and spectral domain,
  the first dispersive element is between the entrance opening and the coded aperture and the second dispersive element is between the coded aperture and the detector;
  wherein the spectrometer is configured such that light incident on the detector is sheared in the second direction so that each location on the detector corresponds with a plurality of spatial locations of the scene.

The plurality of converging elements may comprise at least one concave reflector.

Features of the first aspect may be combined with those of the first aspect. To keep this disclosure concise, the optional features described following the first aspect are not reproduced after the second aspect. Reference to light being received from a particular feature does not mean that the light must necessarily be received directly from that feature.

BRIEF DESCRIPTION OF THE DRAWINGS

Example embodiments of the invention will now be described, with reference to the accompanying drawings, in which.

DETAILED DESCRIPTION

Theory

Consider a linear measurement system represented by the equation y=Ax where x is an N×1 vector of the system's parameters to be measured, y represents an M×1 vector of measured data, and A is the measurement matrix of size M×N. Retrieving x from the known measured data, y, and the measurement matrix, A, is known as the inverse problem.

If one has fewer measured data than the information to be retrieved (i.e. M<N), the problem becomes impossible to solve as there are infinite possible solutions. Some restrictions must be imposed in this under-determined system in order to get a reasonable solution. If x is a sparse vector, then it is possible to get the exact solution of an under-determined system. A vector is called sparse if it has only k non-zero elements, where k<<N. Even though the vector x is sparse, not all measurement matrices can be utilised to retrieve the vector x. A good measurement matrix that can be used to retrieve the sparse vector x should have low coherence, where the coherence is defined as $$\mu(A) = \max_{i \neq j, 1 \leq i, j \leq N} \left( \frac{a_i^T a_j}{\|a_i\|_2 \|a_j\|_2} \right) \quad (1)$$

where $a_i$ is the i-th column of matrix A.

One way to achieve the low coherence in the measurement matrix is randomisation. It has been shown that a random Gaussian matrix will have low coherence with high probability. More recently, it has been shown that random Walsh-Hadamard matrix would work in practice as well. Sparsity is a key in compressed sensing. Even though, the signal of interest is not sparse in its original representation, most of the cases it would be sparse in some domain, e.g. discrete cosine transformation or wavelet. If this is the case, the measurement process can be expressed as y=AΦc where c is the coefficient vector of signal x in other domain and Φ is the sparsifying transformation matrix from the sparse domain to the signal's original representation. The matrix (AΦ) is treated as the measurement matrix in this case.

Assuming the coefficient vector, c, is sparse, one way to retrieve c is by minimising the loss function below:

$$\mathcal{L} = \frac{1}{2}\|y - A\Phi c\|_2^2 + \lambda \|c\|_1 \quad (2)$$

where $\lambda > 0$ is the regulariser coefficient and $\|w\|_p = (\Sigma_i |w_i|^p)^{1/p}$ is the $L_p$-norm of a vector. Another way is to retrieve the interesting signal x, directly, using the total variation TV as the regulariser instead of the $L_1$-norm, $$\mathcal{L} = \frac{1}{2}\|y - A\Phi c\|_2^2 + \lambda \mathrm{TV}(x) \quad (3)$$

where TV can be the isotropic and non-isotropic total variation. The isotropic and non-isotropic TV are respectively given by:

$$TV_{iso}(x) = \sum_i [(\Delta_h x_i)^2 + (\Delta_v x_i)^2]^{1/2} \quad (4)$$

$$TV_{niso}(x) = \sum_i (|\Delta_h x_i| + |\Delta_v x_i|) \quad (5)$$

with $\Delta_h$ and $\Delta_v$ respectively denote the gradient in horizontal and vertical directions.

Various algorithms are already available in solving the optimisation problems (2) and (3). Among them are Two Steps Iterative Shrinkage Thresholding algorithm (TwIST)[1], Fast Iterative Shrinkage Thresholding Algorithm (FISTA)[2], Orthant-Wise Limited memory Quasi-Newton (OWL-QN)[3], and Iterative Hard Thresholding (IHT)[4]. They are gradient-descent based algorithms where a thresholding is applied after each descending step.

[1] J. M. Bioucas-Dias and M. A. T. Figueiredo, IEEE Trans. Image Process. 16, pp. 2992-3004 (2007).
[2] A. Beck and M. Teboulle, SIAM J. Imaging Sciences 2, pp. 183-202 (2009).
[3] G. Andrew and J. Gao, Proc. Intl. Conf. Machine Learning, pp. 33-40 (2007).
[4] T. Blumensath and M. E. Davies, arXiv:0805.0510 (2008).

Figure 2:
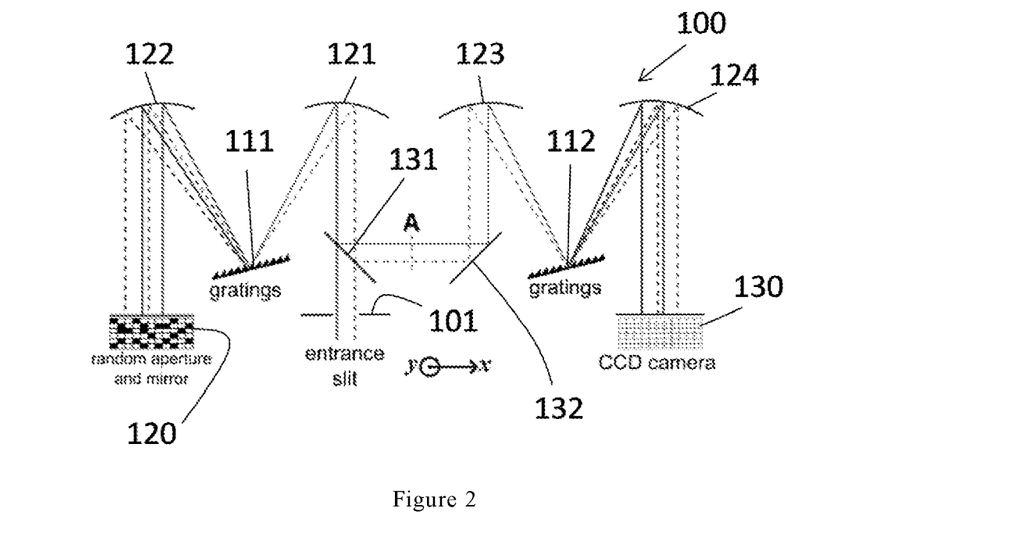
FIG. 2 is a schematic of the optical layout of an imaging spectrometer according to an first embodiment, employing a reflective coded aperture.

Referring to FIG. 2, an optical layout for an imaging spectrometer 100 according to a first embodiment is shown, comprising: an entrance opening 101; first and second dispersive elements 111, 112; first, second, third, and fourth reflectors 121-124; beam splitter 131; plane reflector 132; and detector 130. The path of central rays from the entrance opening 101 through to the detector 130 are illustrated.

Figure 3:
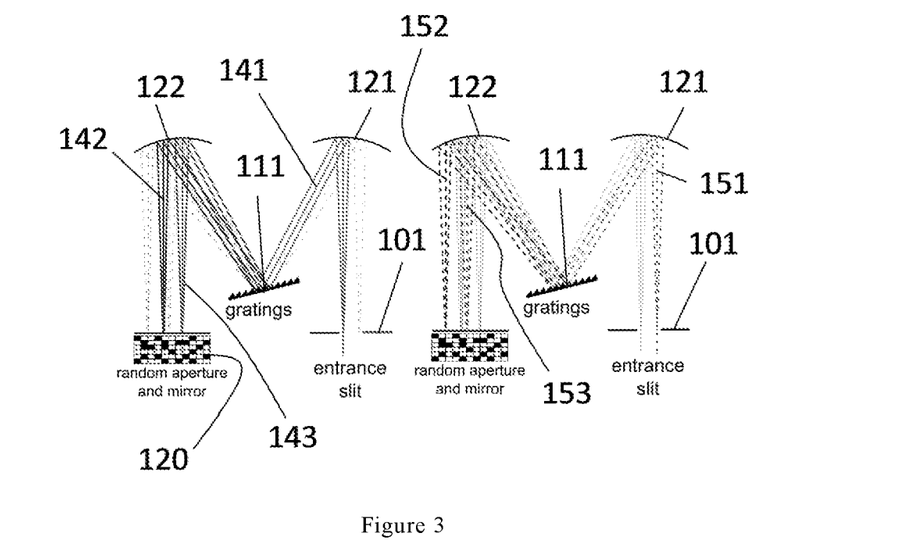
FIG. 3 is a schematic illustrating, in more detail, rays originating from a first entrance slit position and a second entrance slit position.

FIG. 3 shows the rays 141-143 and 151-153 in more detail. Rays will diverge from each position of the entrance opening 101. For simplicity in FIG. 2, only the central rays 141, 151 from a respective first and second position at the entrance opening 101 are shown. In FIG. 3 the central rays 141, 151 from each of the first and second position are shown along with the corresponding diverging rays 142, 143 and 152, 153. These diverging rays are not shown on FIGS. 1 and 3 for clarity.

The entrance opening 101 in the example embodiment is an entrance slit, enabling a spectroscopic image of a long thin scene to be produced (e.g. a plasma wakefield, or an ultra-short duration laser experiment). The entrance slit is 200 microns in width, or about 10 times the detector's pixel size.

Light entering the spectrometer 100 through the entrance slit 101 is transmitted through the beam splitter 131 to the first reflector 121. The first reflector 121 is configured to collimate the light at the first dispersive element 111.

The first dispersive element 111 is a reflective dispersive element—in this case a diffraction grating (for example with 300 lines/mm). The first dispersive element 111 disperses/shears the incident light so that different wavelengths of incident light are reflected away from the first dispersive element at different angles. The light reflected from the first dispersive element 111 is received at the second reflector 122, which focuses the dispersed/sheared light at the coded aperture 120.

Both the first and second reflectors 121, 122 are convex reflectors. More specifically, in this example both the first and second reflectors 121, 122 have the same focal length (15 cm) and are toroidal reflectors. This is a convenient optical arrangement, but is not essential, and reflectors with different focal lengths can be used. In some embodiments at least one (or both) of the first and second reflectors may be replaced with a refractive optical element. An advantage of using reflective optical elements to collimate and focus light in the spectrometer is that these will not introduce dispersion. The dispersion introduced in the present embodiment may be restricted to that introduced by the diffraction gratings, which will be well controlled and not subject to significant aberration.

The coded aperture 120 in this embodiment is configured to reflect a pattern of light back towards, and to dump and/or absorb the inverse of the pattern. The coded aperture array may, for example comprise an array of pixels that either transmit light to a beam dump, or reflect the incident light back along the path of incidence (back toward the second reflector 122. The coded aperture 120 may, for example, comprise 100×100 square pixels with 20 microns side length. The pixels may have a fixed, quasi-random pattern.

The pattern of light reflected from the coded aperture 120 propagates back along the path of incidence, to the second reflector 122, which collimates the reflected pattern of light back at the first dispersive element 111. The dispersion/shear introduced at the first dispersive element is consequently removed. The light from the coded aperture 120 that is reflected by the first dispersive element 111 is subsequently incident on the first reflector 121, which focuses the portion of the returning light that is reflected at the beam splitter 131 at image plane A. A planar reflector 132 subsequently directs the returning light to a third reflector 123, which collimates the light from the imaging plane A at the second dispersive element 112.

The second dispersive element is a further diffraction grating which shears/disperses the light in the opposite sense to the shear/dispersion imparted to light on its way from the entrance opening 101 to the coded aperture 120 by the first dispersive element 111. This results in light in which the modulation is encoded across the spectral and spatial domain at the reflector.

Light reflected from the second dispersive element 112 is focussed by the fourth reflector 124 at the detector 130, which in this example is a charge coupled device focal plane array (but other detector technologies may also be used, such as CMOS image sensors).

The optical arrangement in FIG. 2 is preferably a 4F system. The focal length of each of the reflectors is preferably the same (e.g. each of the reflectors may be a matched optical element).

Figure 4:
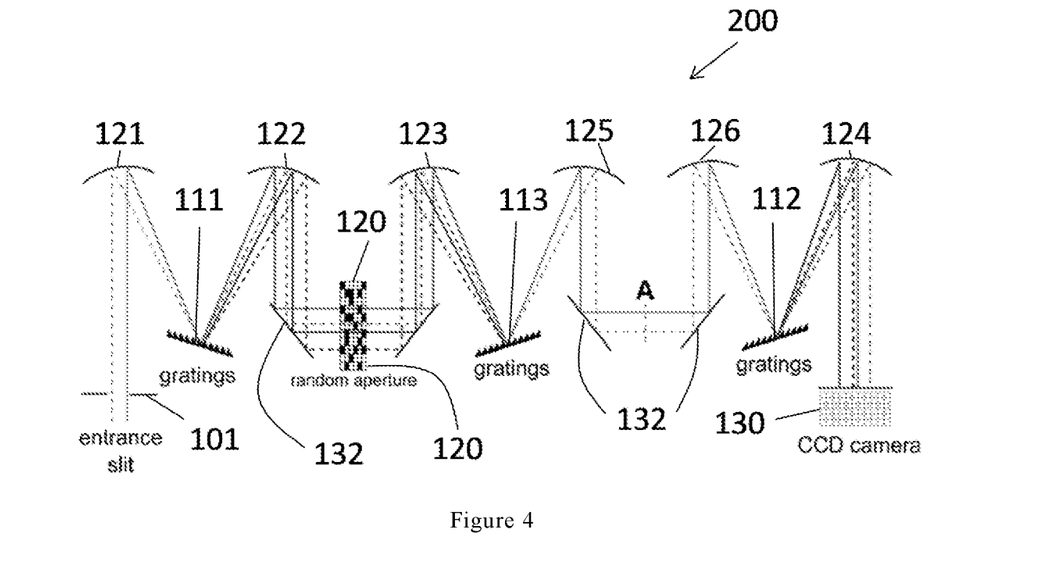
FIG. 4 is a schematic of the optical layout of an imaging spectrometer according to second embodiment, employing a transmissive coded aperture.

The embodiment 100 of FIG. 2 loses at some of the light at the beam splitter 131. FIG. 4 illustrates an alternative "unfolded" configuration in which the beam splitter is not required. This arrangement is similar to that of FIG. 1: light from the entrance opening 121 is collimated at a first dispersive element (grating) 111 by the first reflector 121, and light reflected from the first dispersive element is focussed at the aperture by the second reflector 122. The coded aperture in this embodiment is transmissive, and a pattern is imposed at the focal plane of the second reflector 122 by of the coded aperture 120 (with the remaining light absorbed or reflected away from the optical path). A plane reflector 132 may be provided to fold the optical path between the second reflector 122 and coded aperture 120—this may be convenient, but is not essential. Light from the coded aperture 120 is directed to a fifth reflector 125, which collimates the light at a third dispersive element 113 (again, a diffraction grating). The third dispersive element 113 removes the dispersion that was imposed by the first dispersive element 111, analogous to light in the first embodiment being reflected back toward the detector 130 via the first dispersive element 111. A sixth reflector 126 images the light from the third dispersive element 113 at focal plane A. The optical path from the focal plane A to the detector 130 is the same in this second embodiment 200 as for the first embodiment 100.

An advantage of the "unfolded" arrangement of FIG. 4 is that more light is available at the detector 130, so the signal to noise ratio may be improved where the amount of light per frame is relatively small. A disadvantage is that more optical elements are required.

Figure 5:
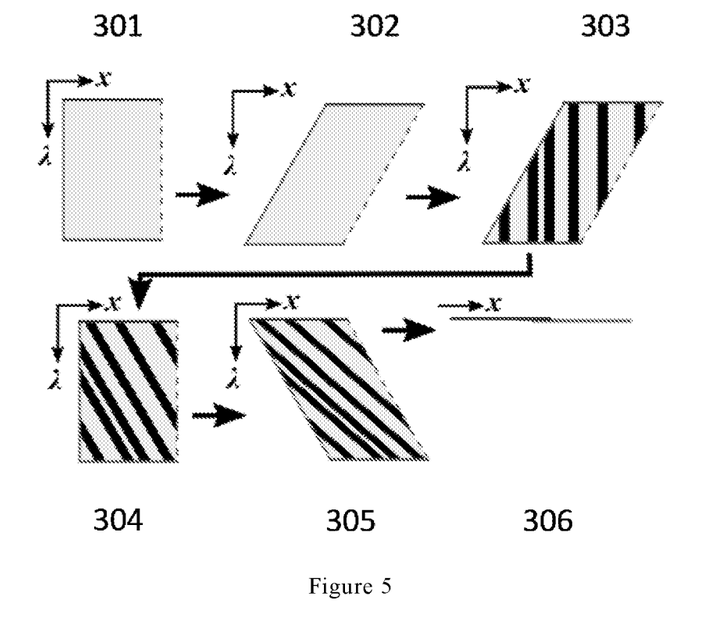
FIG. 5 shows the transformation of the light from entering the spectrometer until reaching the detector.

Referring to FIG. 5, the datacube transformation of the light from entering the spectrometer at the entrance opening 101 to the detector 130 is shown. The datacube 301 at the entrance opening is not dispersed, and each spatial location of the scene at the entrance opening corresponds with a spatial location in the datacube 301 for all wavelengths. After the first dispersive element 111 on the way to the coded aperture, the datacube 302 is dispersed/sheared. The coded aperture 120 therefore applies modulation to a dispersed datacube 302.

The datacube 303 shows the effect of the coded aperture, which blocks regions of the datacube 302 in a spatial pattern (corresponding with the pattern at the coded aperture). The datacube 304 is after the dispersion has been removed by the first dispersive element 111 on the return path (as in FIG. 2) or by the third dispersive element 113. The datacube 305 is after dispersion by the second and final dispersive element 112 (in both embodiments). This datacube 305 is incident on the detector 130, which is not spectrally sensitive, so has the effect of summing the datacube along the wavelength axis for each spatial location of the detector 130. From this recorded intensity profile at the detector, a compressed sensing retrieval algorithm can be applied to obtain the original datacube (such as the TwIST, FISTA, OWL-QN and IHT methods referred to previously).

In spectrometer designs according to an embodiment the detector 130 measures the intensity in the spectral and spatial domain, while the randomisation (from the coded aperture 120) also takes place in the spatial and spectral domain. This gives more randomisation in the measurement, and thus the measurement has high probability of lower coherence and better retrieval ability compared to prior art methods.

In order to demonstrate an embodiment, numerical tests were performed using a computer implemented simulation. In this case, the simulation determines the gradients of the loss from equation (2), $\mathcal{L}$, with respect to the spectral cube's elements, c. The program also determines c that minimises the loss $\mathcal{L}$. The simulation models the datacube transformation using concave toroidal reflectors with focal lengths of f=15 cm and gratings with 300 lines/mm. The random aperture in the simulation has 100×100 square pixels with side length of 20 microns each. The detector array has square pixels with 20 micron edge length, and 100×100 pixels.

The first simulated case uses a spatially chirped light source, where the light has an increasing central wavelength for increasing different x-positions. For every x-position, the light has a Gaussian spectral profile with the full width half maximum (FWHM) is 4.05 nm and the central wavelength is varied around 633 nm. The chirp is 31.25 nm/mm. Gaussian noise with a of 10% of the maximum spectral intensity is included to test the robustness. The width of the entrance slit is 200 microns, or about 10 times the detector's pixel size. For retrieval of the measurement from the information at the detector, the OWL-QN algorithm was employed with the datacube size of $(N_y, N_x, N_\lambda) = (100 \times 11 \times 90)$ voxels. OWL-QN is a second order optimisation algorithm for the $\mathcal{L}_1$ regulariser. The three dimensional Discrete Cosine Transformation (3D-DCT) domain was chosen as the signal's sparse domain.

Figure 6:
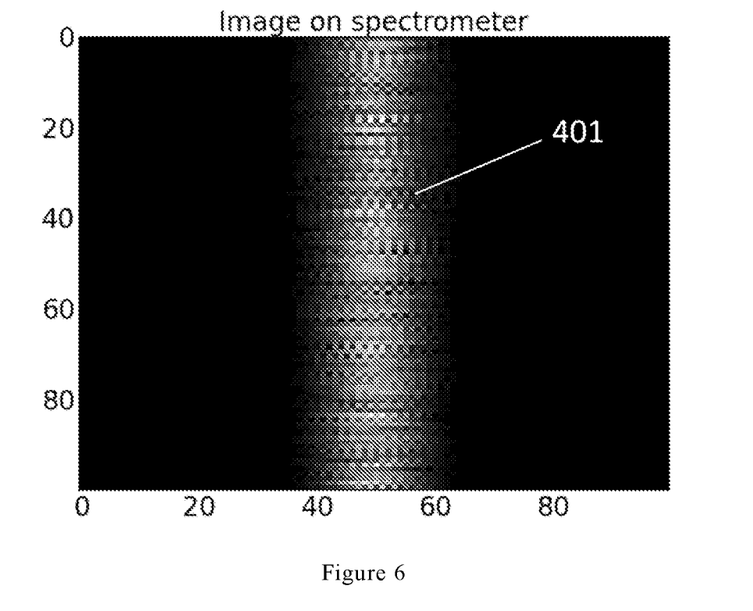
FIG. 6 is a simulated image obtained at the spectrometer detector.

FIG. 6 shows the simulated measured intensity profile 401 at the detector (with intensity mapped against pixel position on the x and y axes). From this simulated measured intensity profile, the complete 3D datacube of the light entering the slit can be retrieved.

Figure 7:
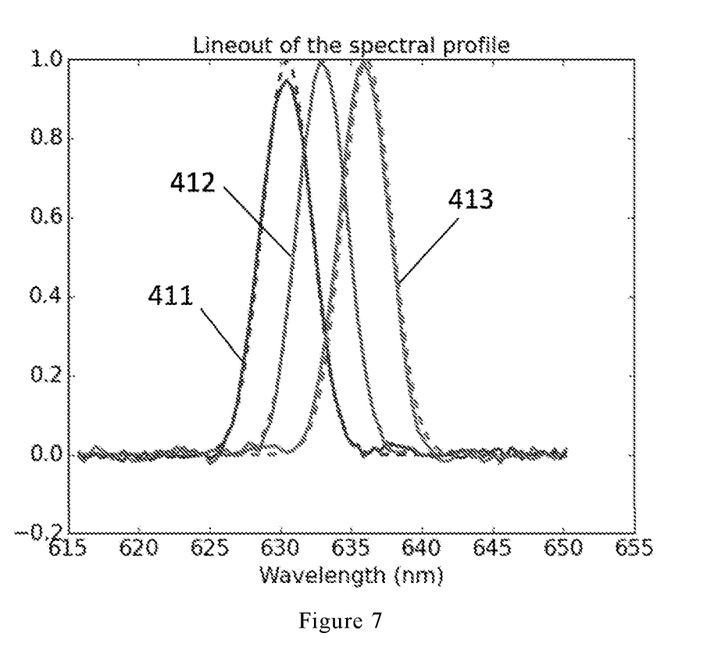
FIG. 7 shows three spectra, extracted from leftmost, centre and rightmost slice of the image of FIG. 6.
Figure 8:
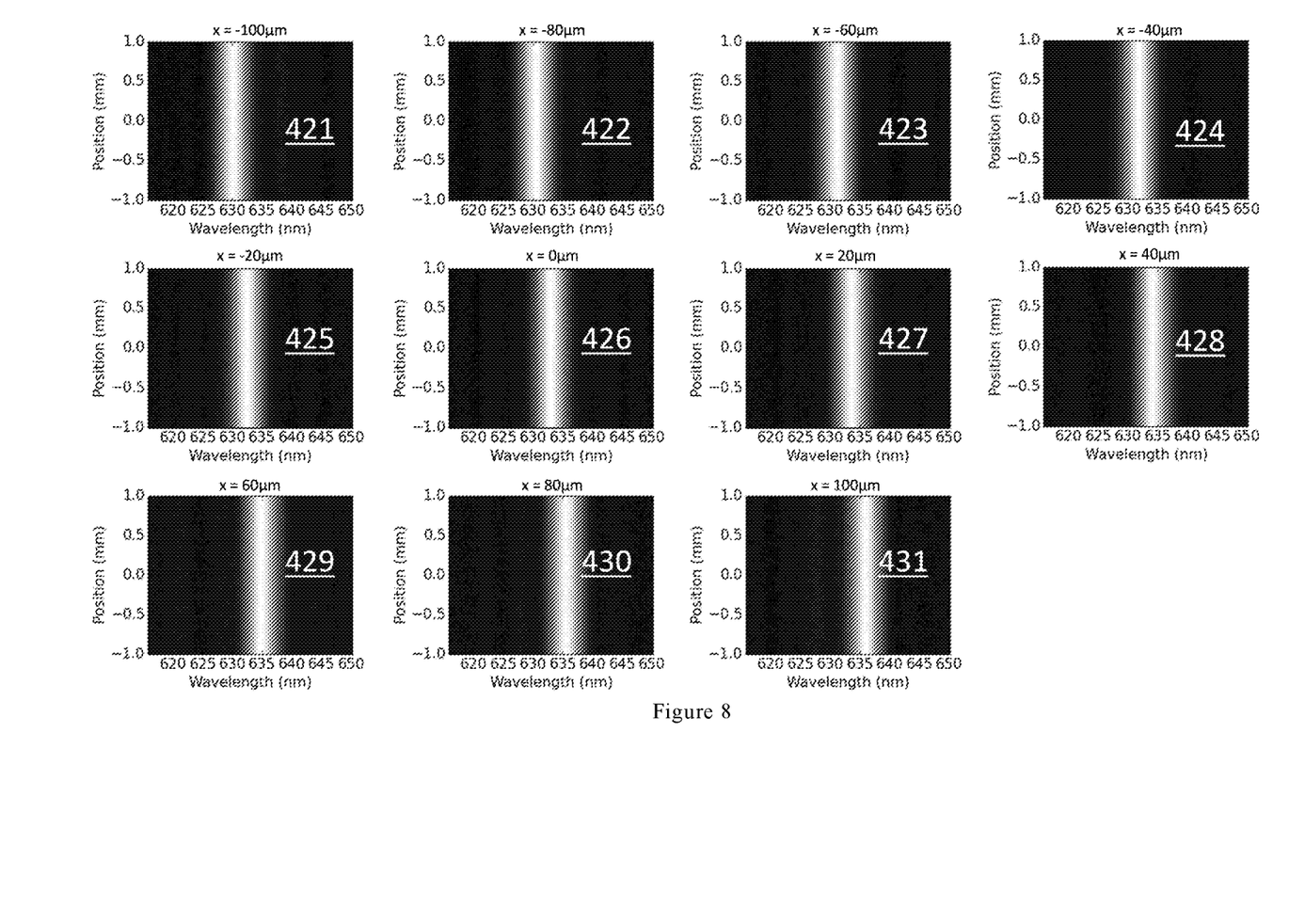
FIG. 8 shows a set of spectral intensity profiles for each of a succession of slices of the image of FIG. 6.

FIG. 7 shows spectral profiles 411, 412, 413 obtained by processing the simulated data at the detector. The profiles 411, 412, 413 respectively correspond with positions x=−100 microns, x=0 microns and x=100 microns. The central spectral profile 412 agrees very well with the original signal, and the spectral profiles 411 and 413 are also in great agreement with the original profiles. FIG. 8 shows maps 421-431 of intensity with respect to wavelength for each of a number of slice locations (x=−100 microns to x=100 microns, in 20 micron steps), and these results are also in good agreement with the original signal.

Another test was done based on spectral interferometry. In spectral interferometry, there are two short laser pulses. One pulse, called as the probe pulse, has some phase modulation while another pulse, the reference pulse, does not have phase modulation. The probe pulse and reference pulse are each temporally chirped. The probe pulse and reference pulse co-propagate and are temporally separated. The spectral profile of the two pulses contains information of the phase modulation of the probe pulse. By applying a high pass filter and obtaining the phase of the spectral profile obtained from both pulses, one can extract the phase modulation of the probe pulse. Implementing this in the 3D spectrometer poses a greater challenge since the spectral interferometry needs post-processing (i.e. phase extraction) of the retrieved signal to obtain useful information.

In this simulated case, the phase of the probe pulse is modulated spatially and spectrally. The modulation is then encoded into the spectral intensity according to the equation below:

$$I(x,y,\omega) = I_0(x,y,\omega)[1+\cos(\omega\tau + \Delta\phi(x,y,\omega))] \quad (6)$$

where $I_0$ is the spectral intensity profile for one pulse and $\phi(x, y, \omega)$ is the phase modulation of the probe pulse. In the 3D spectrometer, the spectral intensity datacube $I(x,y,\omega)$, undergoes the transformation shown in FIG. 4, with $\lambda = 2\pi c/\omega$. The spectral intensity datacube is retrieved from the image captured by the spectrometer and a post-processing analysis is performed to obtained the phase modulation datacube, $\phi(x,y,\omega)$.

Figure 9:
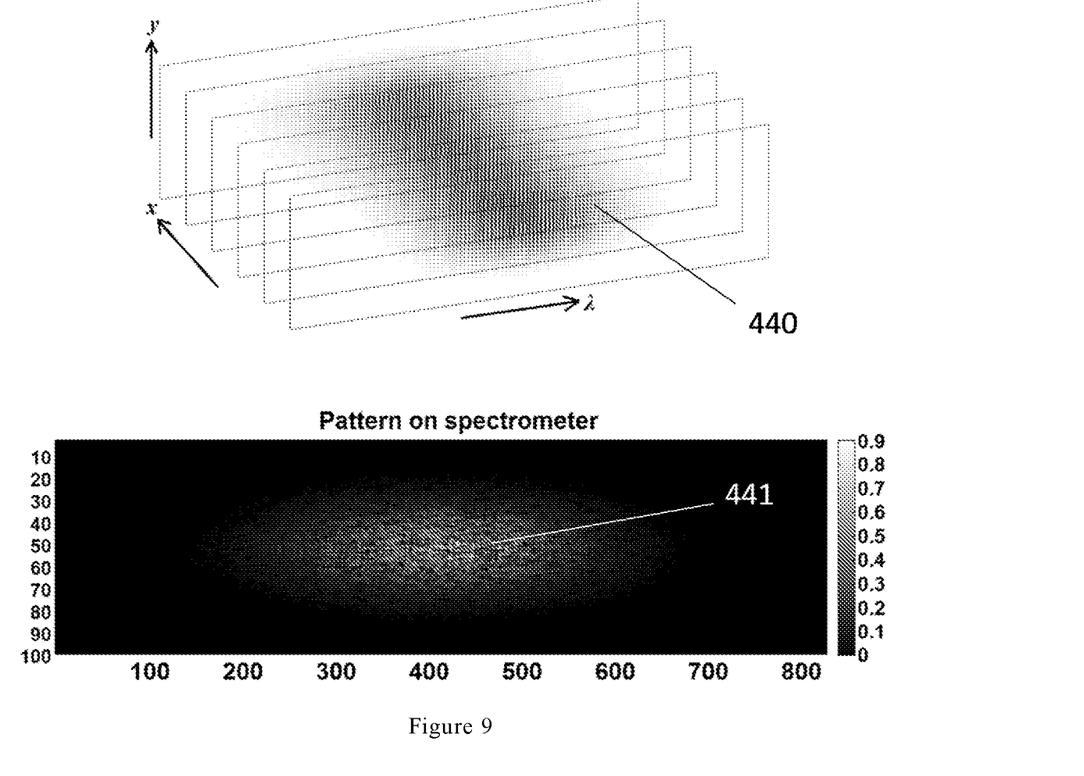
FIG. 9 shows an illustration of a datacube to be inverted according to an embodiment, along with a simulated pattern captured at the detector of a spectrometer according to an embodiment.
Figure 10:
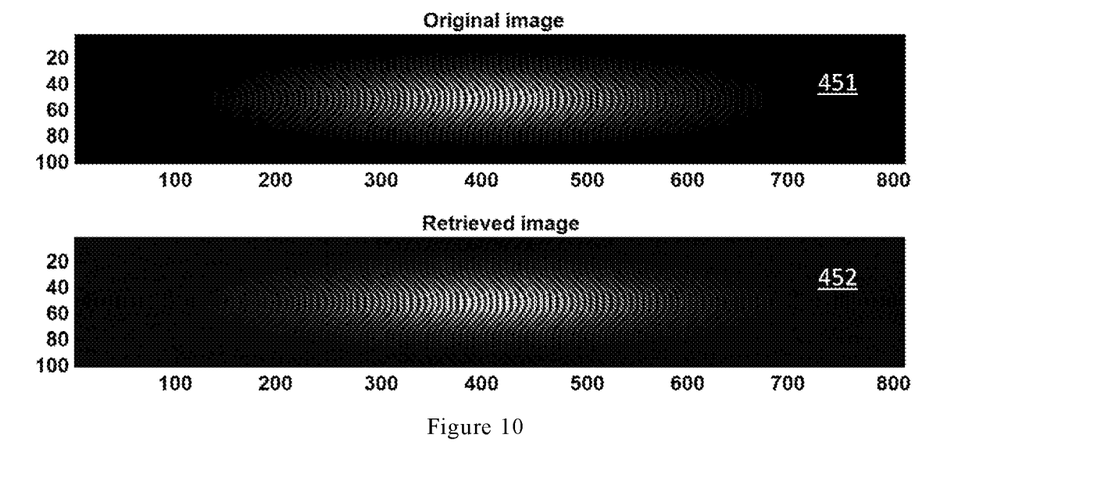
FIG. 10 shows a comparison between an original and retrieved spectral intensity profile for a spectral interferometry example.

In the tested case, there are $N_x = 10$ slices of spectral intensity profiles to be retrieved, each with size $N_\lambda \times N_y = (800 \times 100)$ pixels. The datacube example 440 is shown in FIG. 9. The pattern at the detector of the spectrometer 441 is also shown in FIG. 9. The size of the image on the screen is (809×100) pixels. Retrieving all the spectral intensity profiles was done using the TwIST algorithm. One of the retrieved spectral intensity profiles 452 and its comparison with the original spectral intensity profile 451 is shown in FIG. 10.

Figure 11:
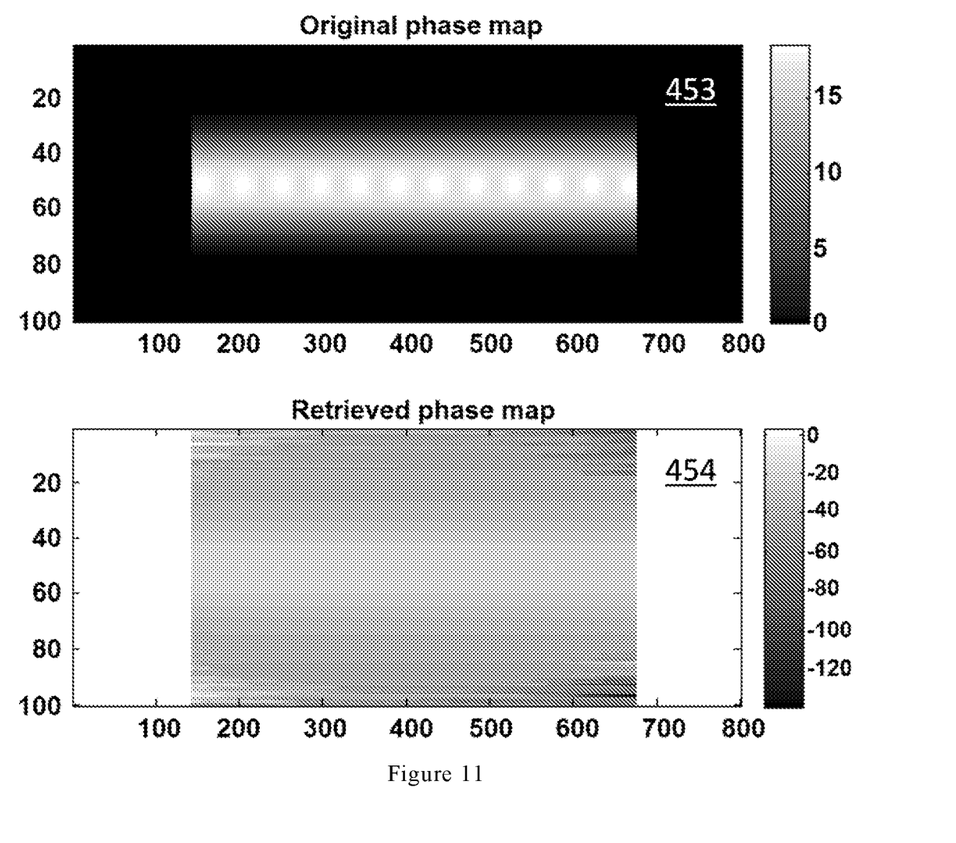
FIG. 11 shows the extracted phase maps from the retrieved and original spectral profiles for the example of FIG. 10.
Figure 12:
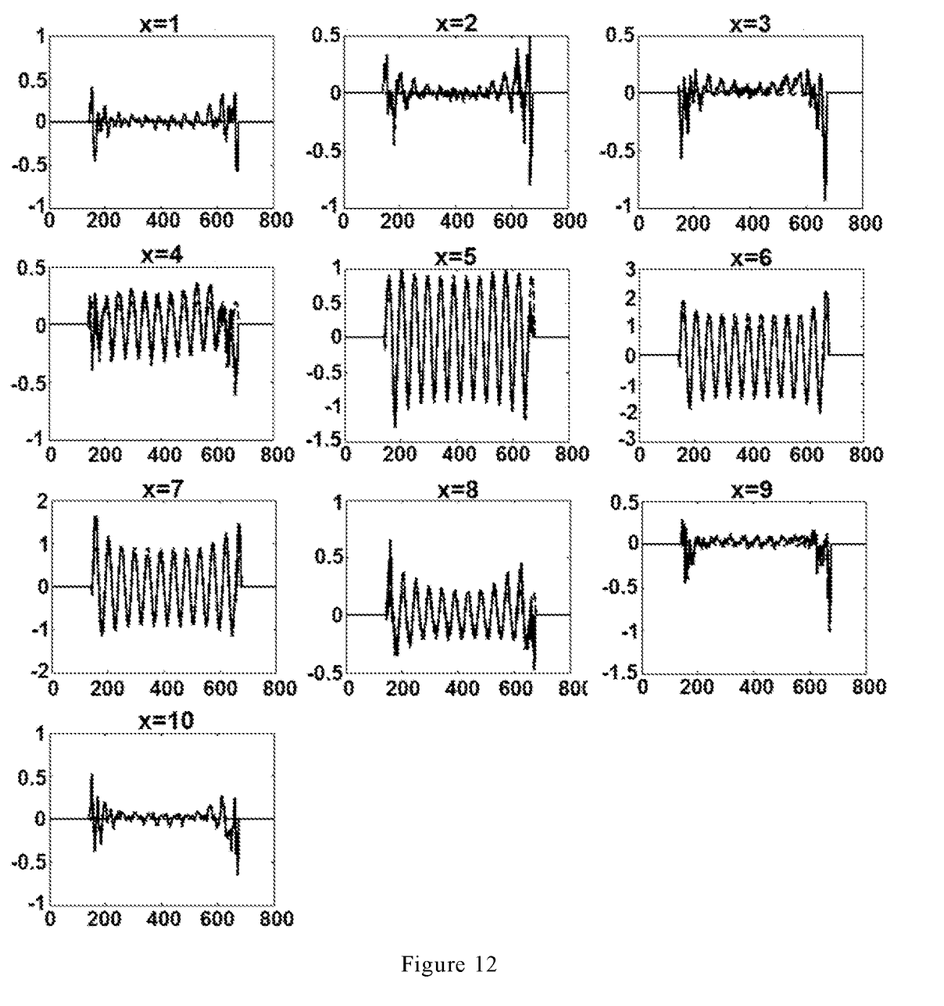
FIG. 12 shows the central lineouts of phase maps for all spectral intensity profiles, comparing retrieved phase maps with those in the original data.

One advantage of the spectrometer design disclosed herein is that it is also robust even with post-processing. FIG. 11 shows the extracted phase maps from the retrieved and original spectral profiles. The comparison for the central lineouts of the phase maps from all the spectral intensity profiles is shown in FIG. 12. The dashed lines in FIG. 12 are the original phase map profile, and the solid lines are the retrieved phase map. The retrieved profiles are in great agreement with original phase maps.

Embodiments of the present disclosure open up new possibilities such as capturing high speed video (e.g. ~trillion fps) for laser-matter interaction, complete spectral profile analysis of laser pulses after interaction with matter, and 3D phase and intensity profile reconstruction of short pulses (e.g. applying techniques like that disclosed in SPIDER[5]).

[5] Iaconis, Chris, and Ian A. Walmsley. "Spectral phase interferometry for direct electric-field reconstruction of ultrashort optical pulses." Optics letters 23.10 (1998): 792-794.

Although examples have been described in which all the optical elements are reflective, in some embodiments some transmissive (e.g. refracting) elements may be used.

Although specific examples have been disclosed to illustrate the present invention, these are not intended limit the scope of the invention, which should be determined with reference to the appended claims.

The invention claimed is:

1. An imaging spectrometer, comprising: an entrance opening configured to admit light to the spectrometer, a coded aperture, at least one dispersive element, a two-dimensional array detector, and a plurality of converging optical elements; wherein:

the plurality of converging optical elements are configured to focus light from the entrance opening at the coded aperture, and to focus light from the coded aperture at the detector, the coded aperture is arranged to modulate light from the entrance opening in at least one of the spatial and spectral domain, the at least one dispersive element comprises a dispersive element between the coded aperture and the detector, wherein the at least one converging optical element comprises at least one concave reflector;

wherein the coded aperture is operable in a reflective mode, so that a coded pattern of light is reflected towards the detector by the coded aperture, and the inverse of the coded pattern of light is dumped and/or absorbed by the coded aperture.

2. The imaging spectrometer of claim 1, wherein the at least one concave reflector is configured do at least one of: i) direct and collimate light at the dispersive element, ii) direct and focus light at the coded aperture or iii) direct and focus light at the detector.

3. The imaging spectrometer of claim 1, wherein the at least one dispersive element comprises a first dispersive element between the entrance opening and the coded aperture, and the dispersive element between the coded aperture and the detector is a second dispersive element.

4. The imaging spectrometer of claim 3, wherein the first dispersive element is arranged to shear light from the entrance opening in a first direction, and the second dispersive element is arranged to shear light from the coded aperture in a second direction, opposite to the first direction.

5. The spectrometer of claim 4, wherein the at least one concave reflector is configured to do at least one of: direct light from the entrance opening to the first dispersive element, direct light from the first dispersive element to the coded aperture, direct light from the coded aperture to the second dispersive element, or direct light from the second dispersive element to the detector; and/or wherein the spectrometer is configured such that light incident on the detector is sheared in the second direction so that each location on the detector corresponds with a plurality of spatial locations of the scene.

6. The imaging spectrometer of claim 3, wherein:
(i) the at least one concave reflector comprises a first concave reflector, arranged to collimate light from the entrance opening at the first dispersive element; and/or
(ii) the at least one concave reflector comprises a second concave reflector, arranged to focus light from the first dispersive element at the coded aperture; and/or
(iii) the at least one concave reflector comprises a third concave reflector, arranged to collimate light at the second dispersive element; and/or
(iv) the at least one concave reflector comprises a fourth concave reflector, arranged to focus light at the detector.

7. The imaging spectrometer of claim 3, wherein the at least one reflector comprises a first, second, third and fourth concave reflector, respectively configured to i) collimate light from the entrance slit at the first dispersive element; ii) focus light from the first dispersive element at the coded aperture; iii) collimate light at the second dispersive element; and iv) focus light at the detector.

8. The imaging spectrometer of claim 7, wherein each of the first, second, third and fourth concave reflector has the same focal length.

9. The imaging spectrometer of claim 1, wherein:
(i) the at least one concave reflector comprises at least one concave toroidal reflector; and/or (ii) the at least one concave reflector has a focal length of between 10 cm and 20 cm.

10. The imaging spectrometer of claim 1, wherein the entrance opening is an entrance slit.

11. The imaging spectrometer of claim 10, wherein the entrance slit is at least 50 microns wide.

12. The imaging spectrometer of claim 1, wherein the coded aperture comprises an array of at least 50×50 pixels.

13. The imaging spectrometer of claim 1, wherein the coded aperture is operable to reflect the coded pattern of light back towards the detector via the first dispersive element, wherein the first dispersive element is configured to, in addition to applying shear to the light from the entrance slit, subsequently remove that shear from the coded pattern of light after reflection at the coded aperture.

14. The imaging spectrometer of claim 13, further comprising a beam splitter configured to direct some of the light from the entrance opening towards the first dispersive element, and to direct some of the returning coded pattern of light from the first dispersive element towards the second dispersive element.

15. The imaging spectrometer of claim 14, wherein the at least one reflector comprises a third curved reflector, and the third reflector is arranged to collimate light from the beam splitter at the second dispersive element.

16. An imaging spectrometer, comprising: an entrance opening configured to admit light to the spectrometer, a coded aperture, at least one dispersive element, a two-dimensional array detector, and a plurality of converging optical elements; wherein:
the plurality of converging optical elements are configured to focus light from the entrance opening at the coded aperture, and to focus light from the coded aperture at the detector,
the coded aperture is arranged to modulate light from the entrance opening in at least one of the spatial and spectral domain,
the at least one dispersive element comprises a dispersive element between the coded aperture and the detector,
wherein the at least one converging optical element comprises at least one concave reflector;
wherein the coded aperture is operable in a transmissive mode, such that a coded pattern of light is transmitted towards the detector by the coded aperture, and the inverse of the coded pattern of light is dumped and/or absorbed by the coded aperture.

17. The imaging spectrometer of claim 16, including the subject matter of claim 3, further comprising a third dispersive element arranged to shear the coded pattern of light from the coded aperture in the second direction to remove the shear from the coded pattern of light.

18. The imaging spectrometer of claim 17, further comprising a fifth reflector, configured to focus light from the third dispersive element at a focal plane.

19. The imaging spectrometer of claim 18, further comprising a sixth reflector, configured to collimate light from the focal plane at the second dispersive element.

* * * * *